United States Patent [19]
Freedman

[11] 3,888,873
[45] June 10, 1975

[54] 4H(1)BENZOTHIOPYRANO(3,4-D)-ISOXAZOLES

[75] Inventor: Jules Freedman, Thiensville, Wis.

[73] Assignee: Colgate-Palmolive Company, New York, N.Y.

[22] Filed: Aug. 27, 1973

[21] Appl. No.: 391,950

[52] U.S. Cl.... 260/307 H; 260/247.1; 260/268 TR; 260/293.57; 260/327 R; 424/248; 424/250; 424/267; 424/272
[51] Int. Cl............................................. C07d 85/22
[58] Field of Search .... 260/307 H, 293.57, 268 TR, 260/247.1 L

[56] References Cited
UNITED STATES PATENTS
3,553,228  1/1971  Friedman............................ 260/307
3,553,229  1/1971  Friedman............................ 260/307

Primary Examiner—Donald G. Daus
Assistant Examiner—Raymond V. Rush
Attorney, Agent, or Firm—T. F. Kryshak; M. L. Youngs

[57] ABSTRACT

The compounds are 4H[1]benzothiopyrano[3,4-d]isoxazoles useful as pharmaceutical agents, especially sedatives or central nervous system depressants. A compound disclosed is N-methyl-4H[1]benzothiopyrano[3,4-d]isoxazole-3-carboxamide-5,5-dioxide.

5 Claims, No Drawings

4H(1)BENZOTHIOPYRANO(3,4-D)-ISOXAZOLES

BACKGROUND OF THE INVENTION

Oxygen analogs of the 4H[1]benzothiopyrano[3,4-d]isoxazoles are disclosed in our U.S. Pat. Nos. 3,553,228, 3,553,229, 3,553,230 and 3,692,796. In addition, the compound methyl 4-oxothiochroman-3-glyoxylate is disclosed in *J. Med. Chem.*, 9, 163 (1966).

DETAILED DESCRIPTION

The novel compounds of the present invention have the following formula

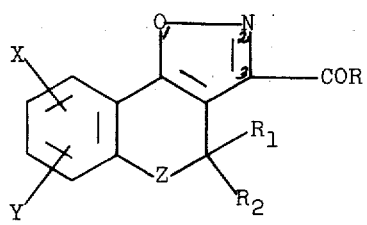

in which X and Y are the same or different members selected from hydrogen, halo such as chloro, bromo or fluoro, hydroxy, lower alkyl of 1 to 4 carbon atoms, nitro, methylenedioxy, lower alkoxy or trifluoromethyl, $R_1$ and $R_2$ are selected from hydrogen or lower alkyl of 1 to 4 carbon atoms or phenyl, Z is S, SO or $SO_2$, R is hydroxyl, lower alkoxy of 1 to 4 carbon atoms or Am, and Am is selected from a.

in which $R_3$ and $R_4$ are the same or different and are selected from hydrogen, lower alkyl of 1 to 4 carbon atoms such as methyl, ethyl, isopropyl or butyl, hydroxy-lower alkyl such as hydroxy ethyl, alkoxy alkyl, alkenyl or 3 to 6 carbon atoms such as allyl and hexenyl, and an aralkyl of 7 to 13 carbon atoms such as benzyl, phenethyl and phenylisopropyl and an aryl, particularly phenyl, or a nuclear substituted phenyl such as a halophenyl or a lower alkoxyphenyl, for example, p-chlorophenyl or p-methoxyphenyl, and b. groups in which $R_3$ and $R_4$ are joined together to form amino groups in which the nitrogen is part of a cyclic group such as morpholino, pyrrolidino, piperidino, 4-lower alkyl-1-piperazino such as 4-methyl-1-piperazino, N-phenyl-lower alkyl piperazino or N-hydroxy-lower alkyl piperazino.

The compounds of the present invention may be conveniently prepared employing as the basic starting material a 4-chromanone of the formula

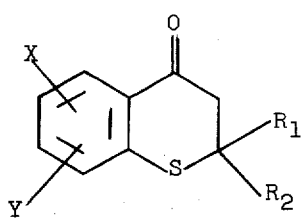

in which $R_1$, $R_2$, X and Y are as previously defined.

The unsubstituted 4-thiochromanone is a known compound and the substituted compounds may be prepared in the manner described in the literature. [C. D. Hurd, et al., *J. Am. Chem. Soc.*, 76, 5065 (1954), and S. Wawzonek, et al., *J. Am. Chem. Soc.*, 76, 1080 (1954)].

Representative of the 4-thiochromanones which may be employed in the described process are:
4-thiochromanone,
6-methoxy-4-thiochromanone,
6-chloro-4-thiochromanone,
6-bromo-4-thiochromanone,
8-methyl-4-thiochromanone,
6-trifluoromethyl-4-thiochromanone,
2,2-dimethyl-4-thiochromanone,
2-phenyl-4-thiochromanone,
6-methyl4-thiochromanone,
6,7-methylenedioxy-4-thiochromanone, and
6-chloro-2-phenyl-4-thiochromanone.

In the preferred method of preparation of the novel compounds, a 4-thiochromanone is treated with a lower dialkyl oxalate such as diethyl oxalate in sodium ethoxide solution in ethanol to form a lower alkyl-4-thiochroman-3-glyoxylate. The ring closure is then effected by treating the glyoxylate with hydroxylaminehydrochloride in ethanol under reflux conditions, thus forming the lower alkyl-4H[1]-benzothiopyrano[3,4-d]isoxazole-3-carboxylate.

The described process may be illustrated as follows:

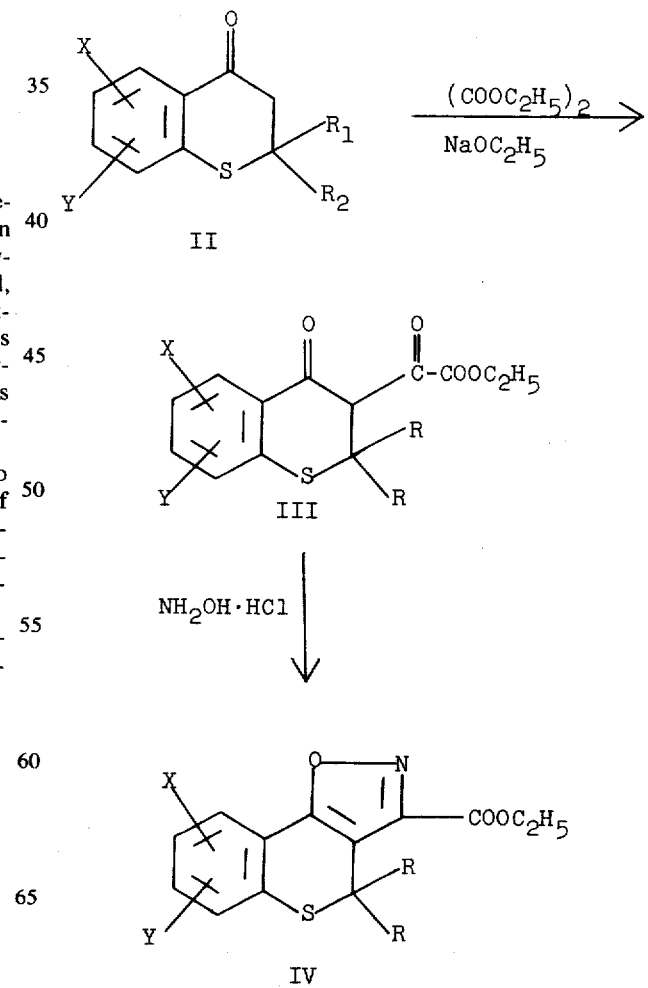

wherein R, X and Y are as previously defined and do not partake in or interfere with the reaction.

Representative of the compounds which may be prepared by the above processes are:
  Ethyl    4H[1]benzothiopyrano[3,4-d]isoxazole-3-carboxylate,
  Propyl    4H[1]benzothiopyrano[3,4-d]isoxazole-3-carboxylate,
  Methyl    8-methoxy-4H[1]benzothiopyrano[3,4-d]isoxazole-3-carboxylate, and
  Ethyl    8-chloro-4H[1]benzothiopyrano[3,4-d]isoxazole-3-carboxylate.

The lower alkyl-4H[1]benzothiopyrano[3,4-d]isoxazole-3-carboxylate (IV) may then be employed to prepare the corresponding amides, carboxylic acid derivatives and oxides by application of conventional techniques which may be illustrated as follows:

4H[1]benzothiopyrano[3,4-d]isoxazole-3-carboxamide,
4,4-Dimethyl-4H[1]benzothiopyrano[3,4-d]isoxazole-3-carboxamide,
N-Methyl-7-methoxy-4H[1]benzothiopyrano[3,4-d]isoxazole-3-carboxamide,
N,N-Dimethyl-8-trifluoromethyl-4H[1]benzothiopyrano[3,4-d]isoxazole-3-carboxamide,
N-Benzyl-4H[1]benzothiopyrano[3,4-d]isoxazole-3-carboxamide,
3-Pyrrolidinocarbonyl-8-chloro-4H[1]benzothiopyrano[3,4-d]isoxazole,
4H[1]benzothiopyrano[3,4-d]isoxazole-3-carboxylic acid,
N-n-butyl-4H[1]benzothiopyrano[3,4-d]isoxazole-3-carboxamide,

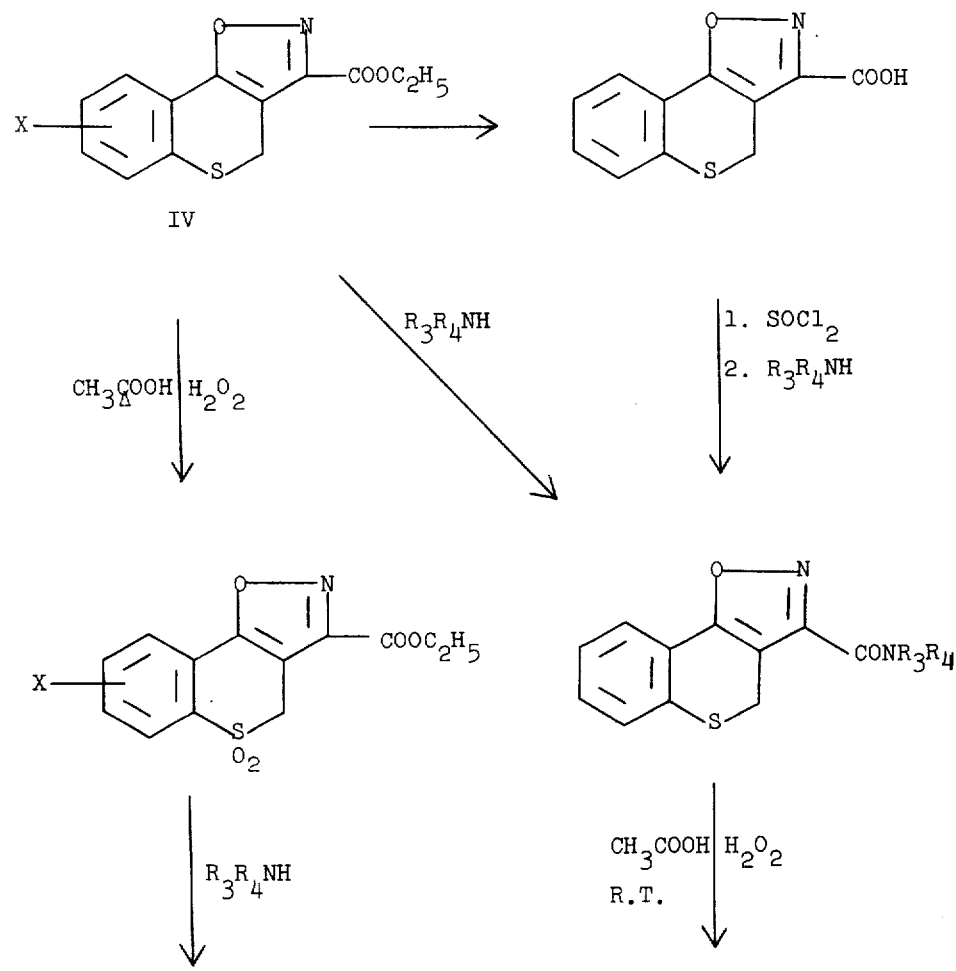

wherein all symbols are as previously defined and do not interfere with or partake in the reaction.

Representative of the compounds which may be prepared by the above processes are:

N-n-butyl-4H[1]benzothiopyrano[3,4-d]isoxazole-3-carboxamide-5-oxide,
8-Chloro-N-methyl-4H[1]benzothiopyrano[3,4-d]isoxazole-3-carboxamide-5,5-dioxide, N-2-propyl-4H[1]-benzothiopyrano[3,4-d]isoxazole-3-carboxamide-5,5-dioxide,
N,N-Dimethyl-4H[1]benzothiopyrano[3,4-d]isoxazole-3-carboxamide-5,5-dioxide,
3-Pyrrolidinocarbonyl-4H[1]benzothiopyrano[3,4-d]-isoxazole-5,5-dioxide,
4H[1]Benzothiopyrano[3,4-d]isoxazole-3-carboxamide-5,5-dioxide,
N-Methyl-4H[1]benzothiopyrano[3,4-d]isoxazole-3-carboxamide,
N-Methyl-4H[1]benzothiopyrano[3,4-d]isoxazole-3-carboxamide-5-oxide,
N-Methyl-4H[1]benzothiopyrano[3,4-d]isoxazole-3-carboxamide-5,5-dioxide, and
8-Chloro-4H[1]benzothiopyrano[3,4-d]isoxazole-3-carboxylic acid.

In animal behavioral tests the following compounds exhibited a central nervous system depressant activity:
N-Methyl-4H[1]benzothiopyrano[3,4-d]isoxazole-3-carboxamide-5,5-dioxide,
N-Methyl-4H[1]benzothiopyrano[3,4-d]isoxazole-3-carboxamide,
4H[1]Benzothiopyrano[3,4-d]isoxazole-3-carboxamide,
N-n-Butyl-4H[1]benzothiopyrano[3,4-d]isoxazole-3-carboxamide,
N-n-Butyl-4H[1]benzothiopyrano[3,4-d]isoxazole-3-carboxamide-5-oxide,
8-Chloro-N-methyl-4H[1]benzothiopyrano[3,4-d]isoxazole-3-carboxamide-5,5-dioxide, and
N-2-Propyl-4H[1]benzothiopyrano[3,4-d]isoxazole-3-carboxamide-5,5-dioxide.

In mice receiving 100 to 300 mg/kg of the compounds intraperitoneally in the form of a 5% acacia suspension, decreased alertness, reactivity, struggle response and other behavioral characteristics of central nervous system depression and sedative activity were observed. As a result of the behavioral studies, the compounds were found to have $LD_{50}$ values in excess of 300 mg/kg. The behavioral studies were conducted in accordance with the procedure set forth by Irwin in "Animal and Clinical Pharmacologic Techniques in Drug Evaluation", J. H. Nodine and P. E. Siegler, Ed., Year Book Publishers, Inc., 1964, pp. 36–54.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water, a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents, and the like, may also be employed.

The unit dosage forms may contain a concentration of 0.1 to 10% or more by weight of one or more of the novel compounds. Generally, such dosage forms will contain about 50 to 500 mg. of the active ingredients. One or more of such dosage forms may be administered daily. In actual practice, the amount of drug required to produce the desired effect will, of course, vary considerably because of patient differences.

The following examples are presented to illustrate this invention:

EXAMPLE 1

Ethyl 4H[1]benzothiopyrano[3,4-d]-isoxazole-3-carboxylate

A mixture of 146 g. (1 mole) of freshly distilled (b.p. 65°–66°/8 mm.) diethyl oxalate, and 164 g. (1 mole) of 4-thiochromanone is added rapidly dropwise to NaOEt solution (from 25 g., 1.13 moles of Na and 1 liter of ethanol). The mixture is stirred overnight at room temperature and poured into 2 liters $H_2O$ containing 100 ml. of HCl. The oil which forms is extracted into 1.5 liters of ether and the solution shaken with 5×200 ml. 2N NaOH. Acidification with HCl gives an oil which does not solidify. This oil (230 g.) is refluxed in 850 ml. of ethanol with 69.9 g. (1 mole) of $NH_2OH.HCl$ for 3 hours. The mixture is diluted with 500 ml. of water and the solids filtered and air dried to give 180 g., m.p. 82°–84°. Recrystallization from 4 parts of ethanol gives 159 g. of ethyl 4H[1]benzothiopyrano[3,4-d]-isoxazole-3-carboxylate, m.p. 90°–92°.

Anal. Calcd. for $C_{13}H_{11}NO_3S$: C, 59.75; H, 4.25; N, 5.37; S, 12.28.
Found: C, 59.29; H, 4.13; N, 5.39; S, 12.54.

EXAMPLE 2

Ethyl 4H[1]Benzothiopyrano[3,4-d]-isoxazole-3-carboxylate 5,5-dioxide

A mixture of 2.61 g. (0.01 mole) of ethyl 4H[1]benzothiopyrano[3,4-d]isoxazole-3-carboxylate, 10 ml. of 30% $H_2O_2$, and 10 ml. of glacial HOAc is heated on the steam bath for 15 minutes and the precipitated solids filtered, rinsed with water, and dried to give 2.2 g., m.p. 163°–165°. Recrystallization from 80 ml. of ethanol gives 1.92 g. of ethyl 4H[1]benzothiopyrano[3,4-d]isoxazole-3-carboxylate-5,5-dioxide, m.p. 166°–167°.

Anal. Calcd. for $C_{13}H_{11}NO_5S$: C, 53.24; H, 3.78; N, 4.78; S, 10.93.
Found: C, 53.36; H, 3.70; N, 4.66; S, 10.50.

EXAMPLE 3

4H[1]Benzothiopyrano[3,4-d]-isoxazole-3-carboxylic acid

Ethyl 4H[1]benzothiopyrano[3,4-d]isoxazole-3-carboxylate (5 g., 0.0192 mole), 25 ml. of 10 % NaOH and 25 ml. of ethanol are stirred at room temperature for one hour and acidified with 20 ml. of 6N HCl. After 20 minutes the solids are filtered, rinsed with $H_2O$, and dried to give 4.6 g., m.p. 190°–191°. Recrystallization from 200 ml. of benzene gives 2.97 g. of 4H[1]benzothiopyrano[3,4-d]isoxazole-3-carboxylic acid, m.p. 190°–191°.

Anal. Calcd. for $C_{11}H_7NO_3S$: C, 56.44; H, 3.03; N, 6.01; S, 13.74.
Found: C, 56.36; H, 3.07; N, 6.02; S, 13.60.

EXAMPLE 4

4H[1]Benzothiopyrano[3,4-d]isoxazole-3-carboxylic acid 5,5-dioxide

A mixture of 10 g. of ethyl 4H[1]benzothiopyrano[3,4-d]-isoxazole-3-carboxylate, 50 ml. of 10% NaOH and 50 ml. of ethanol is stirred for 2 hours at room temperature and then warmed for 15 minutes on the steam bath. After cooling to room temperature, the mixture is acidified with 40 ml. of 6N HCl and the solids are filtered and air dried to give 8.2 g. of 4H[1]benzothiopyrano[3,4-d]isoxazole-3-carboxylic acid 5,5-dioxide, m.p. 128°–130°. After recrystallization from nitromethane, the m.p. is 134°–136°. Recrystallization from, and drying over, toluene raises the m.p. to 173°–175°.

Anal. Calcd. for $C_{11}H_7NO_5S$: C, 49.80; H, 2.66; N, 5.29; S, 12.09.

Found: C, 49.78; H, 2.72; N, 5.21; S, 12.21.

EXAMPLE 5

Ethyl 6-chloro-4-oxothiochroman-3-glyoxylate

To a solution of sodium ethoxide in ethanol (from 12.15 g., 0.55 M of Na and 500 ml. of EtOH) there is added 74.6 g. (0.51 M) of diethyl oxalate followed by 96.5 g. (0.485 M) of 6-chlorothiochromanone. After stirring at room temperature overnight, the mixture is poured into 1.5 liters of ice water containing 50 ml. of concentrated HCl. After stirring 0.5 hour, the yellow solids are filtered and recrystallized from 600 ml. of ethanol to give 130.3 g. of ethyl 6-chloro-4-oxothiochroman-3-glyoxylate, m.p. 74°–76°. Recrystallization of a sample from 4 parts of ethanol gives an analytical sample, m.p. 75°–77°.

Anal. Calcd. for $C_{13}H_{11}ClO_4S$: C, 52.26; H, 3.71; Cl, 11.83.

Found: C, 52.19; H, 3.79; Cl, 11.87.

EXAMPLE 6

Ethyl 8-chloro-4H[1]benzothiopyrano-[3,4-d]isoxazole-3-carboxylate

A mixture of 29.87 g. (0.1 M) of ethyl 6-chloro-4-oxothiochroman-3-glyoxylate, 8.35 g. (0.12 M) of hydroxylamine hydrochloride, and 100 ml. of ethanol is refluxed for 1 hour, cooled, and 50 ml. of water added. The solids are filtered and dried to give 22.8 g. (77.4%), m.p. 114°–117°. Recrystallization from 90 ml. of MeCN gives 16.01 g. of ethyl 8-chloro-4H[1]benzothiopyrano[3,4-d]isoxazole-3-carboxylate, m.p. 128°–130°. Another recrystallization raises the m.p. to 129°–131°.

Anal. Calcd. for $c_{13}H_{10}ClNO_3S$: C, 52.79; H, 3.41; Cl, 11.97; N, 4.74; S, 10.84.

Found: C, 52.75; H, 3.36; Cl, 12.21; N, 4.66; S, 11.14.

EXAMPLE 7

Ethyl 8-chloro-4H[1]benzothiopyrano[3,4-d]-isoxazole-3-carboxylate 5,5-dioxide

A solution of ethyl 8-chloro-4H[1]benzothiopyrano[3,4-d]-isoxazole-3-carboxylate in 100 ml. of warm glacial HOAc is treated with 10 ml. of 30% $H_2O_2$ and the solution heated on a steam bath for 0.5 hour. This is then poured into 300 ml. of cold water and the solids (8.82 g., m.p. 166°–169°) filtered. Recrystallization from 600 ml. of ethanol gives 7.91 g. of ethyl 8-chloro-4H[1]benzothiopyrano[3,4-d]isoxazole-3-carboxylate 5,5-dioxide, m.p. 170°–172°.

Anal. Calcd. for $C_{13}H_{10}ClNO_5S$: C, 47.64; H, 3.07; Cl, 10.82; N, 4.27; S, 9.79.

Found: C, 47.70; H, 3.09; Cl, 10.72; N, 4.22; S, 9.67.

EXAMPLE 8

4H[1]Benzothiopyrano[3,4-d]isoxazole-3-carboxamide

A solution of 26.1 g. (0.1 mole) of ethyl 4H[1]benzothiopyrano[3,4-d]isoxazole-3-carboxylate in 250 ml. of warm ethanol is treated with 50 ml. of concentrated $NH_4OH$ and the mixture stirred overnight. The solids are filtered to give 20.9 g., m.p. 210°–224° (softens 190°). A 10% aliquot is warmed with 100 ml. of dimethoxyethane, insoluble solids filtered, and the filtrate cooled to give 1.0 g of 4H[1]-benzothiopyrano[3,4-d]isoxazole-3-carboxamide, m.p. 233°–235°.

Anal. Calcd. for $C_{11}H_8N_2O_2S$: C, 56.89; H, 3.48; N, 12.06; S, 13.80.

Found: C, 56.81; H, 3.68; N, 12.12; S, 13.59.

EXAMPLE 9

4H[1]Benzothiopyrano[3,4-d]isoxazole-3-carboxamide 5,5-dioxide

A mixture of 5.86 g. (0.02 M) of ethyl 4H[1]benzothiopyrano[3,4-d]isoxazole-3-carboxylate 5,5-dioxide, and 100ml. of EtOH is refluxed and 20 ml. of concentrated $NH_4OH$ added dropwise. After 3.5 hours, the mixture is cooled in ice and filtered to give 3.5 g. of amide. Recrystallization from 75 ml. of glacial acetic acid gives 3.00 g. of 4H[1]benzothiopyrano[3,4-d]isoxazole-3-carboxamide 5,5-dioxide, m.p. 274°–276°.

Anal. Calcd. for $C_{11}H_8N_2O_4S$: C, 50.00; H, 3.05; N, 10.60; S, 12.13.

Found: C, 49.96; H, 3.14; N, 10.57; S, 12.05.

EXAMPLE 10

N-Methyl-4H[1]benzothiopyrano-[3,4-d]isoxazole-3-carboxamide

A solution of ethyl 4H[1]benzothiopyrano[3,4-d]isoxazole-3-carboxylate (13.1 g., 0.05 M) in 300 ml. of hot ethanol is treated with a slow stream of methylamine for 1.45 hours until no ester is present. Cooling gives 10.7 g. of N-methyl-4H[1]benzothiopyrano[3,4-d]isoxazole-3-carboxamide, m.p. 178°–181°.

Anal. Calcd. for $C_{12}H_{10}N_2O_2S$: C, 58.52; H, 4.10; N, 11.37; S, 13.10.

Found: C, 58.58; H, 4.16; N, 11.13; S, 13.11.

EXAMPLE 11

N-Methyl-4H[1]benzothiopyrano[3,4-d]-isoxazole-3-carboxamide 5-oxide

A mixture of 4.92 g. (0.02 M) of N-methyl-4H[1]benzothiopyrano[3,4-d]isoxazole-3-carboxamide, 5ml. of 30% $H_2O_2$ and 50 ml. of glacial HOAc is stirred at room temperature for 2 hours, filtered through Dicalite and poured into 500 ml. of water to give 3.51 g. of N-methyl-4H[1]benzothiopyrano[3,4-d]isoxazole-3-carboxamide 5-oxide, m.p. 220°–222°.

Anal. Calcd. for $C_{12}H_{10}N_2O_3S$: C, 54.95; H, 3.84; N, 10.68; S, 12.23.

Found: C, 55.07; H, 3.84; N, 10.45; S, 11.96.

EXAMPLE 12

N-Methyl-4H[1]benzothiopyrano[3,4-d]-isoxazole-3-carboxamide 5,5-dioxide

The amide is prepared from 5.9 g. (0.02 M) of ethyl 4H[1]benzothiopyrano[3,4-d]isoxazole-3-carboxylate 5,5-dioxide in 300 ml. of hot ethanol. The solution is treated with a slow stream of methylamine for 1.45 hours until no ester is present. Cooling gives 5.4 g. of N-methyl-4H[1]-benzothiopyrano[3,4-d]isoxazole-3-carboxamide 5,5-dioxide, m.p. 226°–227°.

Anal. Calcd. for $C_{12}H_{10}N_2O_4S$: C, 51.80; H, 3.64; N, 10.06; S, 11.51.
Found: C, 52.29; H, 3.77; N, 9.95; S, 11.44.

EXAMPLE 13

N-n-Butyl-4H[1]benzothiopyrano-[3,4-d]isoxazole-3-carboxamide

A mixture of 11.65 g. (0.05 M) of 4H[1]benzothiopyrano[3,4-d]isoxazole-3-carboxylic acid, 7.25 ml. (0.1 M) of $SOCl_2$, 25 ml. of DMF and 100 ml. of benzene is gently refluxed overnight and benzene and excess $SOCl_2$ removed at reduced pressure. A solution of 15 ml. (0.15 M) of n-butyl-amine in 25 ml. of DMF is added dropwise and the mixture stirred overnight. Dilution with water gives a solid which is recrystallized from 50 ml. of acetonitrile to give 5.24 g. of N-n-butyl-4H[1]benzothiopyrano[3,4-d]isoxazole-3-carboxamide, m.p. 131°–133°.

Anal. Calcd. for $C_{15}H_{16}N_2O_2S$: C, 62.48; H, 5.60; N, 9.71; S, 11.12.
Found: C, 62.50; H, 5.40; N, 9.71; S, 11.08.

EXAMPLE 14

N-n-Butyl-4H[1]benzothiopyrano[3,4-d]-isoxazole-3-carboxamide 5-oxide

A mixture of 5.1 g. (0.0177 M) of N-n-butyl-4H[1]-benzothiopyrano[3,4-d]isoxazole-3-carboxamide, 10 ml. of 30% $H_2O_2$, and 50 ml. of acetic acid is stirred at room temperature for 2.5 hours. The solution is diluted to 500 ml. with water and the solids are filtered to give 3.93 g. of N-n-butyl-4H[1]benzothiopyrano[3,4-d]isoxazole-3-carboxamide 5-oxide, m.p. 117°–119°. Recrystallization from $CCl_4$ with charcoal gives 2.45 g. of the product, m.p. 137°–139°, after drying over isopropanol.

Anal. Calcd. for $C_{15}H_{16}N_2O_3S$: C, 59.20; H, 5.30; N, 9.21; S, 10.54.
Found: C, 59.68; H, 5.31; N, 9.26; S, 10.58.

EXAMPLE 15

8-Chloro-N-methyl-4H[1]benzothiopyrano-[3,4d]isoxazole-3-carboxamide 5,5-dioxide A slow stream of methylamine is bubbled through a refluxing mixture of 6.54 g. (0.02 M) of ethyl 8-chloro-4H[1]-benzothiopyrano[3,4-d]isoxazole-3-carboxylate in 125 ml. of EtOH for 2 hours. Cooling and filtering gives 5.55 g. of the amide which is recrystallized from 150 ml. of MeCN to give 4.57 g. of 8-chloro-N-methyl-4H[1]benzothiopyrano-[3,4-d]isoxazole-3-carboxamide 5,5-dioxide, m.p. 236°–238°.

Anal. Calcd. for $C_{12}H_9ClN_2O_4S$: C, 46.08; H, 2.90; Cl, 11.34; N, 8.96; S, 10.25.
Found: C, 46.11; H, 2.99; Cl, 11.33; N, 8.94; S, 10.24.

EXAMPLE 16

N-2-Propyl-4H[1]benzothiopyrano[3,4-d]-isoxazole-3-carboxamide 5,5-dioxide

A mixture of 5.86 g. (0.02 M) of ethyl 4H[1]benzothiopyrano[3,4-d]isoxazole-3-carboxylate 5,5-dioxide, 2.95 g. (0.05 M) of isopropylamine and 50 ml. of ethanol is refluxed overnight and cooled to give 4.95 g. of the amide. Recrystallization from 60 ml. of ethanol gives 4.46 g. of N-2-propyl-4H[1]benzothiopyrano[3,4-d]isoxazole-3-carboxamide 5,5-dioxide, m.p. 158°–160°.

Anal. Calcd. for $C_{14}H_{14}N_2O_4S$: C, 54.89; H, 4.61; N, 9.15; S, 10.45.
Found: C, 55.00; H, 4.67; N, 9.20; S, 10.51.

EXAMPLE 17

N,N-Dimethyl-4H[1]benzothiopyrano[3,4-d]-isoxazole-3-carboxamide 5,5-dioxide

A mixture of 5.86 g. (0.02 M) of ethyl 4H[1]benzothiopyrano[3,4-d]isoxazole-3-carboxylate 5,5-dioxide, and 110 ml. of ethanol is refluxed for 3 hours while a slow stream of dimethylamine gas is bubbled through the solution. Concentration to ca. 30 ml. and cooling gives 4.73 g. of the amide. Recrystallization from 160 ml. of ethanol gives 3.60 g. of N,N-dimethyl-4H[1]benzothiopyrano[3,4-d]isoxazole-3-carboxamide 5,5-dioxide, m.p. 172°–174°.

Anal. Calcd. for $C_{13}H_{13}N_2O_4S$: C, 53.23; H, 4.47; N, 9.55; S, 10.92.
Found: C, 53.40; H, 4.17; N, 9.45; S, 10.72.

EXAMPLE 18

3-Pyrrolidinocarbonyl-4H[1]benzothiopyrano[3,4-d]isoxazole 5,5-dioxide

A mixture of ethyl 4H[1]benzothiopyrano[3,4-d]isoxazole-3-carboxylate 5,5-dioxide, 2.85 g. (0.04 M) of pyrrolidine, and 110 ml. of EtOH is refluxed overnight and the mixture cooled in ice. Filtration gives 5.5 g. of the amide. Recrystallization from 50 ml. of acetonitrile with charcoal gives 2.17 g. of 3-pyrrolidinocarbonyl-4H[1benzothiopyrano[3,4-d]isoxazole 5,5-dioxide, m.p. 190°–192°.

Anal. Calcd. for $C_{15}H_{14}N_2O_4S$: C, 56.59; H, 4.43; N, 8.80; S, 10.07.
Found: C, 56.66; H, 4.46; N, 8.76; S, 10.15.

I claim:
1. A compound of the formula

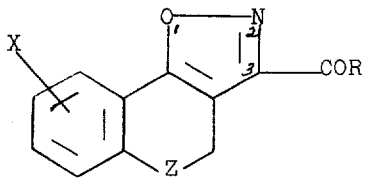

I in which X is hydrogen or chloro, Z is —S(O)— or —S(O)(O)—, R is hydroxyl, lower alkoxy of 1 to 4 carbon atoms or $N(R_3)(R_4)$, in which $R_3$ and $R_4$ are the same or different and are selected from hydrogen or lower alkyl of 1 to 4 carbon atoms, or, alternatively, $R_3$ and $R_4$, together with the nitrogen atom to which they are attached, form pyrrolidino.

2. A compound of claim 1 in which Z is SO.
3. A compound of claim 1 in which Z is $SO_2$.
4. The compound of claim 1 which is N-methyl-4H[1]-benzothiopyrano[3,4-d]isoxazole-3-carboxamide-5,5-dioxide.
5. The compound of claim 1 which is N-n-butyl-4H[1]-benzothiopyrano[3,4-d]isoxazole-3-carboxamide-5-oxide.

* * * * *